United States Patent [19]
Miller

[11] 3,744,081
[45] July 10, 1973

[54] LEAF COLLECTION CONTAINER SUPPORT
[76] Inventor: Ann Miller, 810 High St., Bethlehem, Pa. 18018
[22] Filed: July 19, 1971
[21] Appl. No.: 163,726

[52] U.S. Cl.............................. 15/257.1, 248/101
[51] Int. Cl............................................ B65f 1/04
[58] Field of Search....................... 15/257.1, 257.9, 15/257; 248/99, 100, 101; 150/2

[56] References Cited
UNITED STATES PATENTS
3,135,984   6/1964   Henke................................ 15/257.1

Primary Examiner—Leon G. Machlin
Attorney—Charles A. Wilkinson

[57] ABSTRACT

A plastic leaf collection bag is temporarily secured to the ground while supported with its opening extending substantially vertically by an adjustable frame means in position to allow leaves to be conveniently swept into the bag.

12 Claims, 5 Drawing Figures

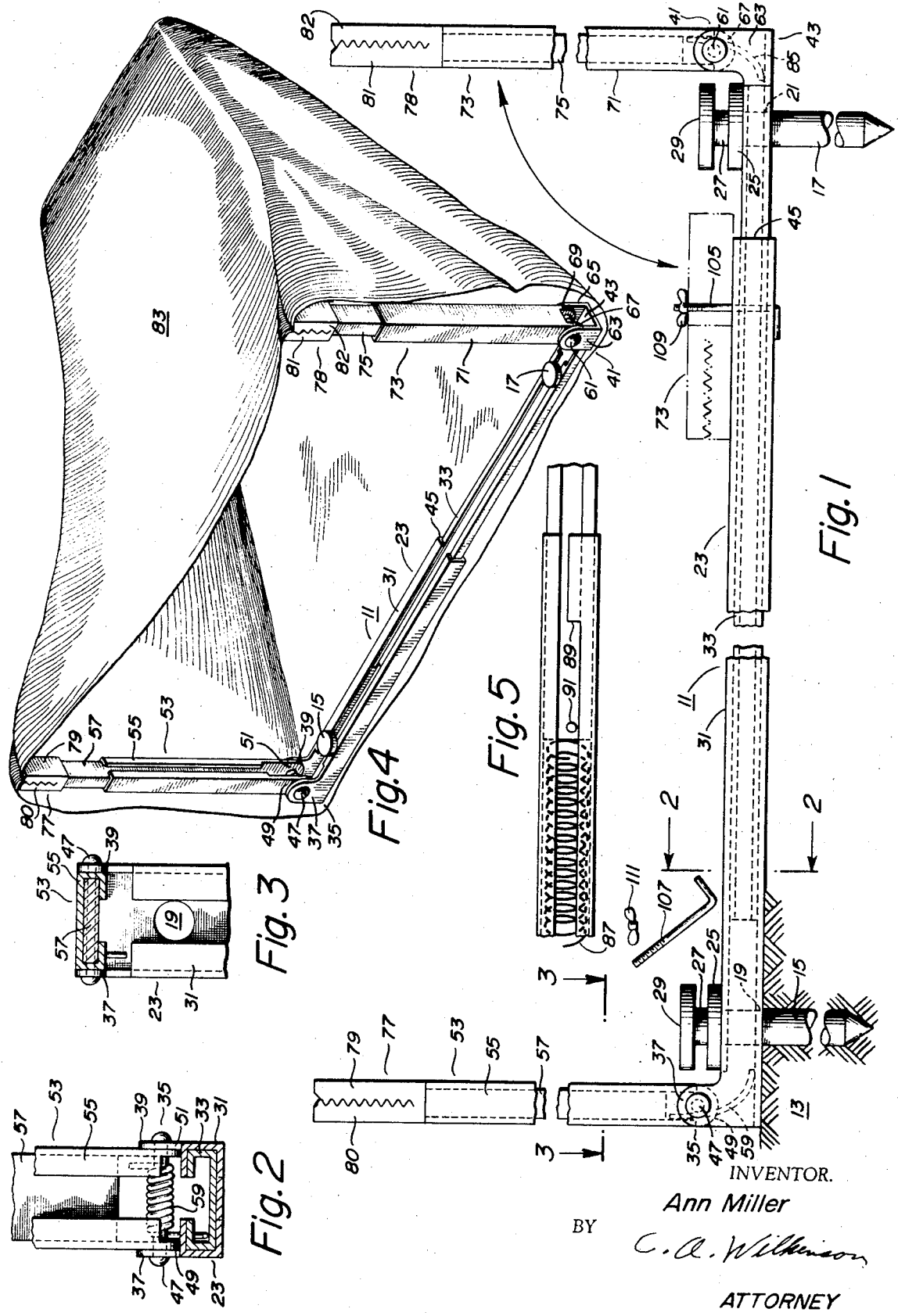

3,744,081

LEAF COLLECTION CONTAINER SUPPORT

BACKGROUND OF THE INVENTION

The present invention relates generally to the disposal of leaves which have fallen from trees and similar garden debris and more particularly to the disposition of disposal bags for the convenient collection and later disposal of all such debris.

Disposable plastic leaf coolection bags have in recent years come into widespread use for the convenient and sanitary collection and disposal of leaves which have fallen from suburban and other trees especially in the autumn. It has hitherto, however, a been a major problem to deposit the leaves within the bag. The great majority of leaves are by custom raked into piles for later disposal. Usually the pile of leaves has been picked up manually from the pile or piles and deposited within a container of one sort or another. Since the advent of plastic bag type disposal means the leaves have been usually lifted by hand and dropped or thrust into the opening of the bag which is customarily held by another person, or less conveniently, in one hand of the person attempting to deposit the leaves in the bag. Occasionally the "leaf raker" has laid the bag on the ground with rocks or the like positioned to weigh down the edge and while holding one side of the bag in his hand has, usually rather ineffectively, attempted to rake or sweep the leaves into the bag. Various devices have also been available to hold the mouths of bags, such as refuse bags and the like, open while trash or other articles are lifted and deposited in them. No frame or other means for holding the mouths of bags open in a vertical plane adjacent the ground have, however, been available for effective use in the raking or sweeping of leaves into a disposal bag.

SUMMARY OF THE INVENTION

The foregoing difficulties and objections of the prior art and practice have now been obviated by the present invention. In accordance with the invention there is provided an arrangement for the efficient insertion of leaves and similar garden debris into a disposal bag by raking or sweeping consisting essentially of an expansible frame insertable within the mouth of a plastic disposal bag and adapted for secural to said bag on one side by appropriate gripping means and to the ground and the bag together on the opposite side by ground piecing means driven into the ground.

BRIEF DESCRIPTION OF THE DRAWINGS

FIG. 1 is an elevation of the expansible frame of the present invention.

FIG. 2 is a cross sectional detail along 2—2 of FIG. 1.

FIG. 3 is a cross sectional detail along 3—3 of FIG. 1.

FIG. 4 is an isometric view of the expansible frame arrangement of the present invention positioned in a plastic leaf disposal bag in position for the receipt of leaves.

FIG. 5 is a detail of an alternative apparatus arrangement providing automatic expansion for the various members.

DESCRIPTION OF THE PREFERRED EMBODIMENT

In FIG. 1 there is shown a frame 11 supported upon the ground 13 and secured to said ground 13 by two ground piercing pins 15 and 17 which extend into the ground or earth through openings 19 and 21 in an elongated extendable telescoping base 23. Each pin 15 and 17 has a head 25 which contacts the upper surface of the base 23 to hold it securely to the ground. Preferably the pins 15 and 17 will each have an additional short shaft 27 extending upwardly from the heads 25 surmounted by a supernumerary head 29 which is adapted for manual or other grasping for expeditious withdrawal of the pins 15 and 17 from the earth when desired.

The base member 23 is formed from an elongated female section 31 and an elongated male section 33 which telescopes or slides within the section 31. At the outer extremity of section 31 there is positioned a hinge assembly 35 comprised in part of two upwardly extended flanges 37 and 39. Likewise at the outer extremity of the male section 33 there is positioned a hinge assembly 41 comprised in part of a U-shaped body 43 secured to the outside of the end of the male section 33 in a position such that when the two sections 31 and 33 are completely telescoped the inner end 45 of female section 31 contacts body 43 to prevent further telescoping.

A pin 47 passes through the flanges 37 and 39 of hinge assembly 35 and flanges 49 and 51 on the lower end of an elongated extendable arm member 53. Arm 53 is comprised of a female section 55 from which the flanges 49 and 51 are extended and a male section 57 slidably telescoping within female section 55. As shown the male section 57 may be a solid section formed of rectangular rod stock or the like. A coiled spring 59 is wrapped about hinge pin 47 so that the ends of the spring 59 contact the inside portions of the female section 31 of base 23 and the female section 55 of arm 53 to continuously bias the two sections away from each other.

In a like manner there is a hinge pin 61 passing through the two upwardly extending arms 63 and 65 of the U-shaped body 43 of hinge assembly 41 and two flanges 67 and 69 extending from a female section 71 of an elongated extendable arm member 73 identical to arm 53. The female section 71 has a solid male section 75 similar to the male section 57 of arm 53 telescoped within it in a similar manner.

Each of the male sections 57 and 75 of arms 53 and 73 have a securing means 77 and 78 respectively attached to the upper ends thereof. Securing means 77 and 78 are shown in the FIGURES as comprised of alligator like jaws 79 and 80, and 81 and 82, respectively, which are hinged to the ends of the male sections 57 and 75 and are preferably biased towards each other by internal spring means, not shown. The securing means 77 and 78 are adapted to catch or secure a folded down section of a plastic bag 83, as shown in FIG. 4, between the respective jaw sections 79 and 80, and 81 and 82. A coiled spring 85 is wrapped around the hinge pin 61 and its ends contact male section 33 of base 23 and female section 71 of arm 73 respectively to bias these two members away from each other. If desired internal coil spring means 87 may be disposed internally of the three respective female sections 31, 55 and 71 and contacting the corresponding male sections 33, 57 and 75 to constantly urge these sections into extended position. In this case a suitable stop 89 will be provided on the female sections to engage a stop pin 91 on the corresponding male sections to prevent overextensions. FIG. 5 illustrates a composite detal of this preferred spring mounting construction which will be the same for the base 23 and the two arms 53 and 73. Suitable locking pins 105 and 107 with wing nut type heads 109 and 111 may in this case also be provided to prevent automatic extension of the various sections and elevation of the arm members 53 and 73 when the frame is not in use. Locking pin 105 and associated wing nut 109 is shown holding arm 73 in folded position against base 23 and locking pin 105 and associated wing nut 111 is shown dismounted in FIG. 1. It will be recognized that the pins 15 and 17 will not interfere with the folding of the arms 53 and 73 against the base 23 because the arms will normally not be folded while the frame is secured to the ground.

The frame 11 and its various parts may be formed of any suitable substantance such as metal or plastic, or of a suitable combinator of substances. Preferably, however, the frame 11 will be formed mostly of plastic except for the springs and in some cases the various pins which may be formed of metal.

When the assembly is to be used for the collection of dry leaves the frame 11, which will be initially in its folded and unexpanded position, in which condition it may be readily stored, will be unlocked by the withdrawal of the locking pins 105 and 107, if these are provided, and will then be inserted into the opening of a plastic leaf collection bag in a half unfolded but still telescoped position. Once inside the mouth of the bag the arms 53 and 73 are unfolded or allowed to unfold under the urging of the springs 59 and 85 until they are preferably substantially perpendicular to the base 23. The telescoping sections 31 and 33 of the base 23 will then be extended and the telescoping sections 55 and 57, and 71 and 75 of arms 53 and 73 respectively will be extended until the mouth of the bag is nearly extended to its full opening size. The jaws 79 and 80, and 81 and 82 of the securing means 77 and 78 on the upper ends of arms 53 and 73 will next be clamped over folds in the plastic bag. It will be recognized that the shape and dimensions of the opening in the bag may be controlled to a certain degree by whether the arms 53 and 73 or the base 23 are extended to their greatest length. The major circumferential dimensions of the mouth of the bag are, of course, not altered except by the amount of the bag material gathered into the folds within the jaws 79 and 80, and 81 and 82.

After the arms 53 and 73 and the base 23 are suitably extended or allowed to extend under the influence of the coil springs, if these are provided — as is most desirable — the frame 11 and bag 83 will be positioned on the ground in the location in which it is desired to rake or sweep the leaves into the bag. The pins 15 and 17 are pressed into soft ground through the pin openings 19 and 21 in the base and pierce the plastic of the bag securing both the frame 11 and the plastic bag 83 to the ground. If the ground or earth is hard due to baking in the sun or the like the pins may be forced into the earth by light blows from a mallet, hammer, handy rock or other implement.

After the bag 83 is secured in position with its mouth held open by the frame 11, leaves may be conveniently raked or swept into the bag. It will be found that if the frame is positioned several inches inside the mouth of the plastic bag 83 the lip of the bag will turn over during sweeping of leaves over the lips and will fold over the base 23 forming a very convenient inclined ramp or inclined plane over which the leaves are very easily swept. This allows the leaves to pass smoothly over the base 23 and into the bag 83.

I claim:

1. Adjustable folding frame means for maintaining a substantially vertically disposed opening closely adjacent to the ground in a flexible container comprising:
   a. a first linearly extendable base member comprising
      i. a first elongated section,
      ii. a second elongated section slidably engaged with said first section,
      iii. hinge means on opposite ends of said first and second sections,
   b. two linearly extendable elevating members each comprising
      i. a third elongated section movably secured to the said first and second sections of said base member through said hinge means,
      ii. a fourth elongated section slidably engaged with said third elongated section,
      iii. securing means adapted for attachment to said flexible container secured to said fourth elongated section, and
   c. elongated ground piercing means adapted for engagement with said first and second elongated sections to attach said frame means and flexible container means to the ground.

2. Adjustable frame means according to claim 1 additionally comprising
   d. spring means to bias said third and fourth elongated sections during support of said flexible container into a position at a substantial angle with respect to said base member.

3. Adjustable frame means according to claim 2 wherein said second elongated section of said base member telescopes into said first elongated section.

4. Adjustable frame means according to claim 3 wherein said third and fourth elongated sections of said elevating members telescope one within the other.

5. Adjustable frame means according to claim 4 wherein said securing means of paragraph (b) subparagraph (iii) comprise two jaw members movable toward and away from each other and at least one of which jaw members has flexible container engaging means effective to secure said flexible container to said jaws.

6. Adjustable frame means according to claim 1 wherein said second elongated section of said base member telescopes into said first elongated section.

7. Adjustable frame means according to claim 6 wherein said third and fourth elongated sections of said elevating members telscope one within the other.

8. Adjustable frame means according to claim 7 wherein said securing means of paragraph (b) subparagraph (iii) comprises opposed jaw members movable toward and away from each other and at least one of which jaw members has flexible container engaging means effective to secure said flexible container to said jaws.

9. Adjustable frame means according to claim 8 wherein at least one of said base and linearly extendable elevating members are extendable by spring means urgingin the component sections of said members into extended position.

10. A leaf collecting device comprising:
    a. a flexible plastic container means having an opening in one end, b. an adjustable frame means comprising slidably interengaged elongated frame members, said frame means adapted for expansion in at least two directions by slidable longitudinal adjustment between said interengaged elongated frame members within the opening of said flexible plastic container means to contact the inside of said container means and expand the opening thereof in a substantially vertical plane, c. container gripping means to secure said flexible container means to said expansible frame means adjacent the upper portions of said opening in said container means, and d. elongated ground piercing means adapted for passage through said flexible container means and said expansible frame means adjacent the lower portion of said flexible container and engageable with said expansible frame means adjacent the ground.

11. A leaf collecting arrangement according to claim 10 wherein the adjustable frame means of (b) comprises at least three telescoping sections biased to extend in at least two divergent directions.

12. A leaf collecting arrangement according to claim 10 additionally comprising e. spring means to bias said telescoping members into extended position.

* * * * *